«12» United States Patent
Slobodyanskiy et al.

«10» Patent No.: US 8,661,822 B2
«45» Date of Patent: Mar. 4, 2014

«54» ACOUSTICALLY STIFFENED GAS TURBINE COMBUSTOR SUPPLY

«75» Inventors: Ilya Slobodyanskiy, Kazan (RU); John Lipinski, Simpsonville, SC (US); Shiva Srinivasan, Greer, SC (US); Dmitry Tretyakov, Moscow (RU)

«73» Assignee: General Electric Company, Schenectady, NY (US)

«*» Notice: Subject to any disclaimer, the term of this patent is extended or adjusted under 35 U.S.C. 154(b) by 808 days.

«21» Appl. No.: 12/716,198

«22» Filed: Mar. 2, 2010

«65» Prior Publication Data

US 2011/0048021 A1    Mar. 3, 2011

«51» Int. Cl.
F02C 7/24    (2006.01)

«52» U.S. Cl.
USPC ............ 60/725; 60/737; 60/738; 60/739; 60/740; 60/741; 60/742; 60/747; 60/748; 181/213; 181/216; 181/219; 431/114

«58» Field of Classification Search
USPC ............ 60/725, 737–748; 181/213, 216, 219; 431/114
See application file for complete search history.

«56» References Cited

U.S. PATENT DOCUMENTS

| 5,373,695 | A | 12/1994 | Aigner et al. | |
|---|---|---|---|---|
| 5,644,918 | A | 7/1997 | Gulati et al. | |
| 5,685,157 | A | 11/1997 | Pandalai et al. | |
| 6,370,879 | B1* | 4/2002 | Stalder et al. | 60/725 |
| 6,464,489 | B1* | 10/2002 | Gutmark et al. | 431/1 |
| 6,546,729 | B2* | 4/2003 | Hellat et al. | 60/725 |
| 6,634,457 | B2 | 10/2003 | Paschereit et al. | |
| 7,076,956 | B2* | 7/2006 | Young et al. | 60/725 |
| 7,320,222 | B2 | 1/2008 | Flohr et al. | |
| 7,331,182 | B2* | 2/2008 | Graf et al. | 60/725 |
| 2006/0000220 | A1 | 1/2006 | Sattinger | |
| 2007/0102235 | A1 | 5/2007 | Tobik et al. | |
| 2007/0169992 | A1 | 7/2007 | Wasif et al. | |
| 2008/0118343 | A1 | 5/2008 | Arthur et al. | |
| 2009/0133377 | A1 | 5/2009 | Kenyon et al. | |
| 2009/0266047 | A1 | 10/2009 | Kenyon et al. | |

FOREIGN PATENT DOCUMENTS

CN    101495721    7/2009
GB    2443838    5/2008

OTHER PUBLICATIONS

Chinese Office Action dated Nov. 12, 2013.

* cited by examiner

Primary Examiner — Gerald L Sung
Assistant Examiner — Craig Kim
«74» Attorney, Agent, or Firm — Fletcher Yoder P.C.

«57» ABSTRACT

In one embodiment, a system includes a variable geometry resonator configured to couple to a fluid path upstream from a combustor of a turbine engine. The variable geometry resonator is configured to dampen pressure oscillations in the fluid path and the combustor.

20 Claims, 8 Drawing Sheets

ACOUSTICALLY STIFFENED GAS TURBINE COMBUSTOR SUPPLY

CROSS-REFERENCE TO RELATED APPLICATION

This application claims priority to and the benefit of Russian Patent Application No. 2009132684, entitled "ACOUSTICALLY STIFFENED GAS TURBINE COMBUSTOR SUPPLY", filed Aug. 31, 2009, which is herein incorporated by reference in its entirety.

BACKGROUND OF THE INVENTION

The subject matter disclosed herein relates to a gas turbine engine and, more specifically, to an acoustically stiffened gas turbine combustor supply.

In general, gas turbine engines combust a mixture of compressed air and fuel to produce hot combustion gases. Combustion may occur in multiple combustors positioned radially around the longitudinal axis of the gas turbine engine. Air and fuel pressures within each combustor may vary cyclically with time. These fluctuations may drive combustor pressure oscillations at various frequencies. If one of the frequency bands corresponds to a natural frequency of a part or subsystem within the gas turbine engine, damage to that part or the entire engine may result.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine engine that includes a compressor, a turbine and a combustor disposed downstream from the compressor and upstream from the turbine. The turbine engine also includes a fluid injection system configured to inject one or more fluids into the combustor and a variable geometry resonator coupled to the fluid injection system. Furthermore, the turbine engine includes a controller configured to tune the variable geometry resonator in response to feedback.

In a second embodiment, a system includes a variable geometry resonator configured to couple to a fluid path upstream from a combustor of a turbine engine. The variable geometry resonator is configured to dampen pressure oscillations in the fluid path and the combustor.

In a third embodiment, a method includes receiving pressure feedback associated with a combustor of a turbine engine. The method also includes tuning a resonator coupled to a fluid path upstream from the combustor based on the feedback.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may reduce combustor driven oscillations by dampening pressure fluctuations within fluid supplies (e.g., liquid and/or gas lines). A geometrically adjustable resonator may be coupled to each fluid supply (e.g., air, fuel or diluent) and tuned to a frequency of pressure oscillation within the combustor. By coupling resonators to fluid supplies instead of a combustion zone of the combustor, resonators may be constructed of less temperature resistant materials because they are not directly exposed to hot combustion gases. Certain embodiments may include a controller configured to tune the resonators to a frequency that dampens oscillations within the fluid supplies and combustor. The controller may be communicatively coupled to a pressure sensor in fluid communication with the combustor to measure the frequencies of pressure oscillations. The controller may also be communicatively coupled to the resonators, and configured to tune the resonators to frequencies detected by the pressure sensor. Resonators may include Helmholtz resonators and/or quarter wave resonators, among others. In certain embodiments, multiple resonators, tuned to different frequencies, may be coupled to each fluid supply to dampen multiple frequencies of pressure oscillations within the combustor.

Figure 1:
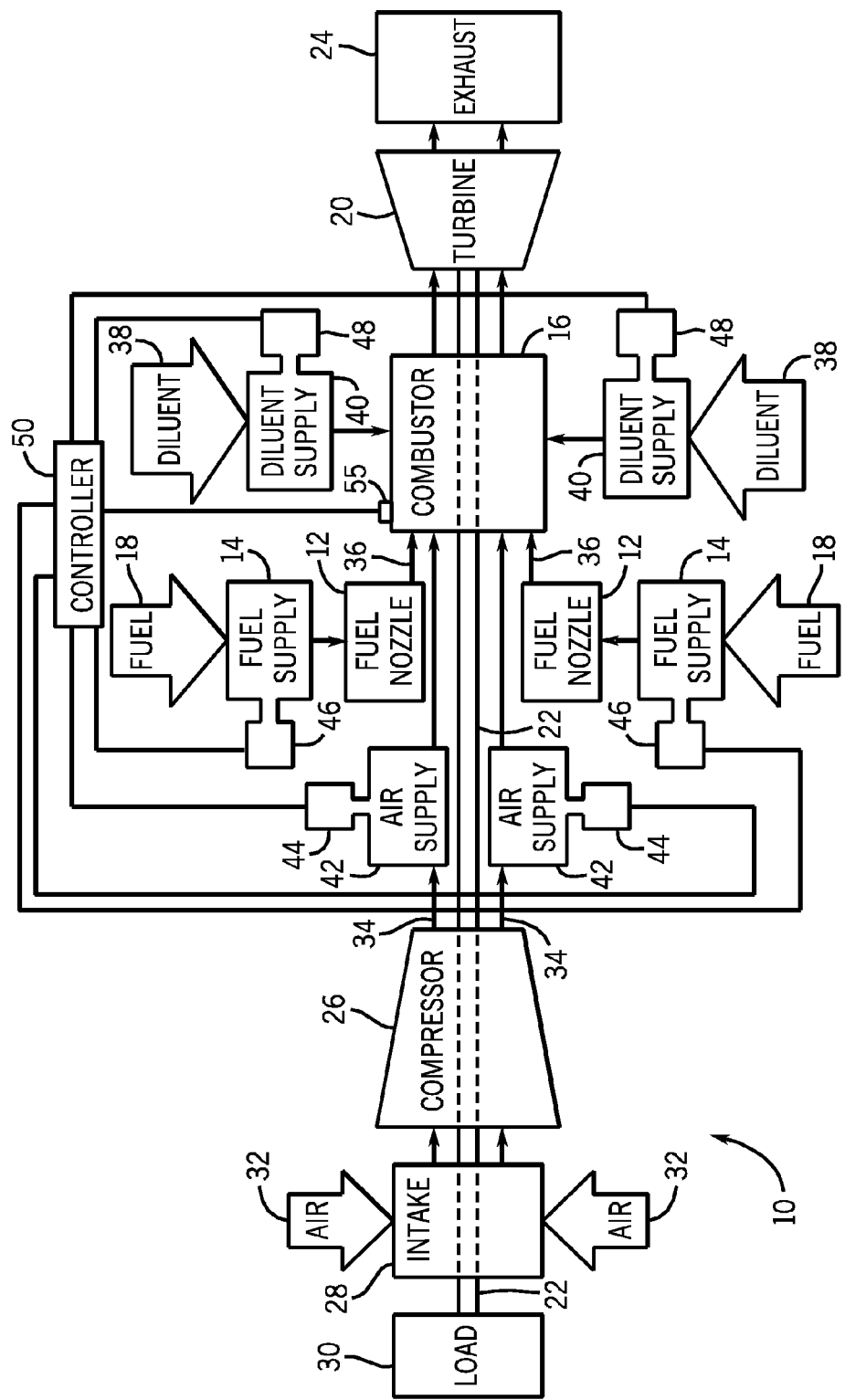
FIG. 1 is a block diagram of a turbine system having resonators coupled to an air supply, a fuel supply and a diluent supply to reduce combustor pressure oscillations in accordance with certain embodiments of the present technique.

Turning now to the drawings and referring first to FIG. 1, a block diagram of an embodiment of a gas turbine system 10 is illustrated. The diagram includes fuel nozzle 12, fuel supply 14, and combustor 16. As depicted, fuel supply 14 routes a liquid and/or gas fuel 18, such as natural gas, to the turbine system 10 through fuel supply 14 and fuel nozzle 12 into combustor 16. As discussed below, fuel nozzle 12 is configured to inject fuel 18 into combustor 16. Air is injected directly into combustor 16 which ignites and combusts a fuel-air mixture, and then passes hot pressurized exhaust gas into a turbine 20. The exhaust gas passes through turbine blades in turbine 20, thereby driving turbine 20 to rotate. In turn, the coupling between blades in turbine 20 and shaft 22 will cause the rotation of shaft 22, which is also coupled to several components throughout turbine system 10, as illustrated. Eventually, the exhaust of the combustion process may exit turbine system 10 via exhaust outlet 24.

In an embodiment of turbine system 10, compressor vanes or blades are included as components of compressor 26. Blades within compressor 26 may be coupled to shaft 22, and will rotate as shaft 22 is driven to rotate by turbine 20. Compressor 26 may intake air to turbine system 10 via air intake 28. Further, shaft 22 may be coupled to load 30, which may be powered via rotation of shaft 22. As appreciated, load 30 may be any suitable device that may generate power via the rotational output of turbine system 10, such as a power generation plant or an external mechanical load. For example, load 30 may include an electrical generator, a propeller of an airplane, and so forth. Air intake 28 draws air 32 into turbine system 10 via a suitable mechanism, such as a cold air intake, for subsequent mixture of air 32 with fuel 18 via combustor 16. As will be discussed in detail below, air 32 taken in by turbine system 10 may be fed and compressed into pressurized air by rotating blades within compressor 26. The pressurized air may then be fed into combustor 16, as shown by arrow 34. Fuel may also be fed into combustor 16 from fuel nozzle 12, as shown by arrow 36. Combustor 16 may then mix the pressurized air and fuel to produce an optimal mixture ratio for combustion, e.g., a combustion that causes the fuel to more completely burn, so as not to waste fuel or cause excess emissions.

Furthermore, a diluent 38 may be injected into fuel nozzle 12 or directly into combustor 16, as illustrated, via diluent supply 40. Diluents may include steam, water, nitrogen and carbon dioxide, among others. Diluent injection may reduce the emission of oxides of nitrogen (NOx), particulates, oxides of sulfur (SOx) and/or oxides of carbon (COx) when turbine system 10 operates at reduced power. Diluents may also provide increased turbine performance under certain operating conditions.

Turbine system 10 also includes resonators coupled to fluid supplies which may reduce pressure oscillations within the fluid supplies and combustor 16. Specifically, pressurized air 34 from compressor 26 flows through an air supply 42 before entering combustor 16. A resonator 44 is coupled to air supply 42 to dampen air pressure oscillations. Similarly, a resonator 46 is coupled to fuel supply 14 to dampen fuel pressure oscillations. In addition, a resonator 48 is coupled to diluent supply 40 to dampen diluent oscillations. By dampening oscillations within fluid supplies, these resonators may reduce pressure oscillations within combustor 16, thereby protecting turbine system 10 against the possibility of fatigue and premature wear to various components within combustor 16, and upstream and downstream of combustor 16.

However, due to varying combustor temperature and turbine load conditions, the frequency of combustor driven oscillations may vary with time. To compensate, the resonators may be geometrically configurable such that they may be continuously tuned to dampen combustor oscillations of varying frequency. In the present embodiment, a controller 50 is communicatively coupled to each of the resonators 44, 46 and 48, and to a pressure sensor 55 in fluid communication with combustor 16. Controller 50 may be configured to detect the frequency of pressure oscillations within combustor 16, fuel supply 14, diluent supply 40 and/or air supply 42. In alternative embodiments, controller 50 may also be configured to detect the frequency of pressure oscillations downstream of combustor 16, vibrations within turbine system 10, flame temperature within combustor 16 and/or other parameters indicative of pressure oscillations. Controller 50 may then tune the resonators 44, 46 and 48 to match the detected frequency. In this manner, fluid supply oscillations may be dampened, reducing the magnitude of pressure oscillations within combustor 16.

Figure 2:
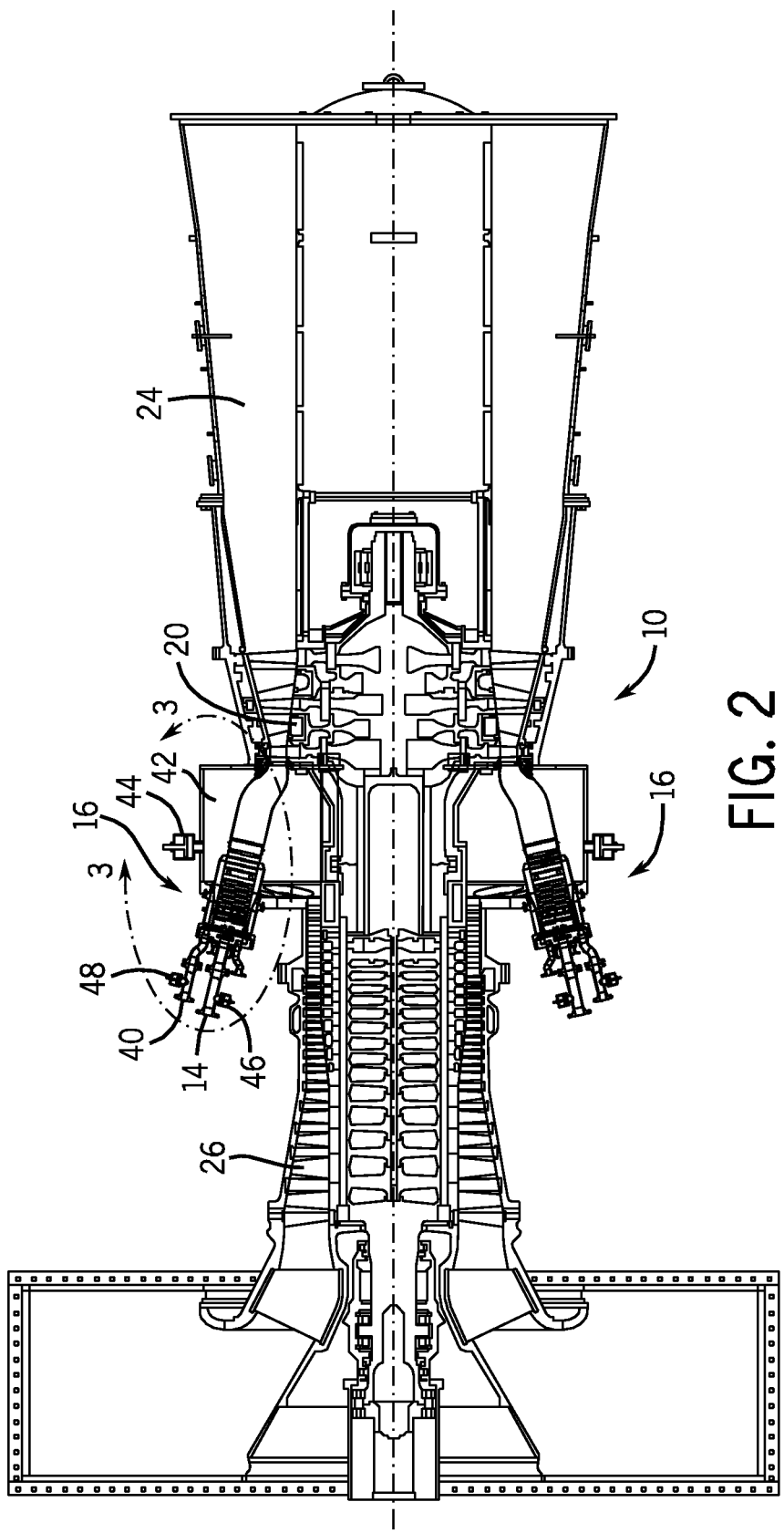
FIG. 2 is a cutaway side view of the turbine system, as shown in FIG. 1, in accordance with certain embodiments of the present technique.

FIG. 2 shows a cutaway side view of an embodiment of turbine system 10. As depicted, the embodiment includes compressor 26, which is coupled to an annular array of combustors 16. For example, six combustors 16 are located in the illustrated turbine system 10. Each combustor 16 includes one or more fuel nozzles 12, which feed fuel to a combustion zone located within each combustor 16. For example, each combustor 16 may include 1, 2, 3, 4, 5, 6, 7, 8, 9, 10, or more fuel nozzles 12 in an annular or other suitable arrangement. Combustion of the air-fuel mixture within combustors 16 will cause vanes or blades within turbine 20 to rotate as exhaust gas passes toward exhaust outlet 24. As will be discussed in detail below, resonator 44 coupled to air supply 42, resonator 46 coupled to fuel supply 14 and resonator 48 coupled to diluent supply 40 may reduce pressure oscillations within the respective supplies and combustor 16.

Figure 3:
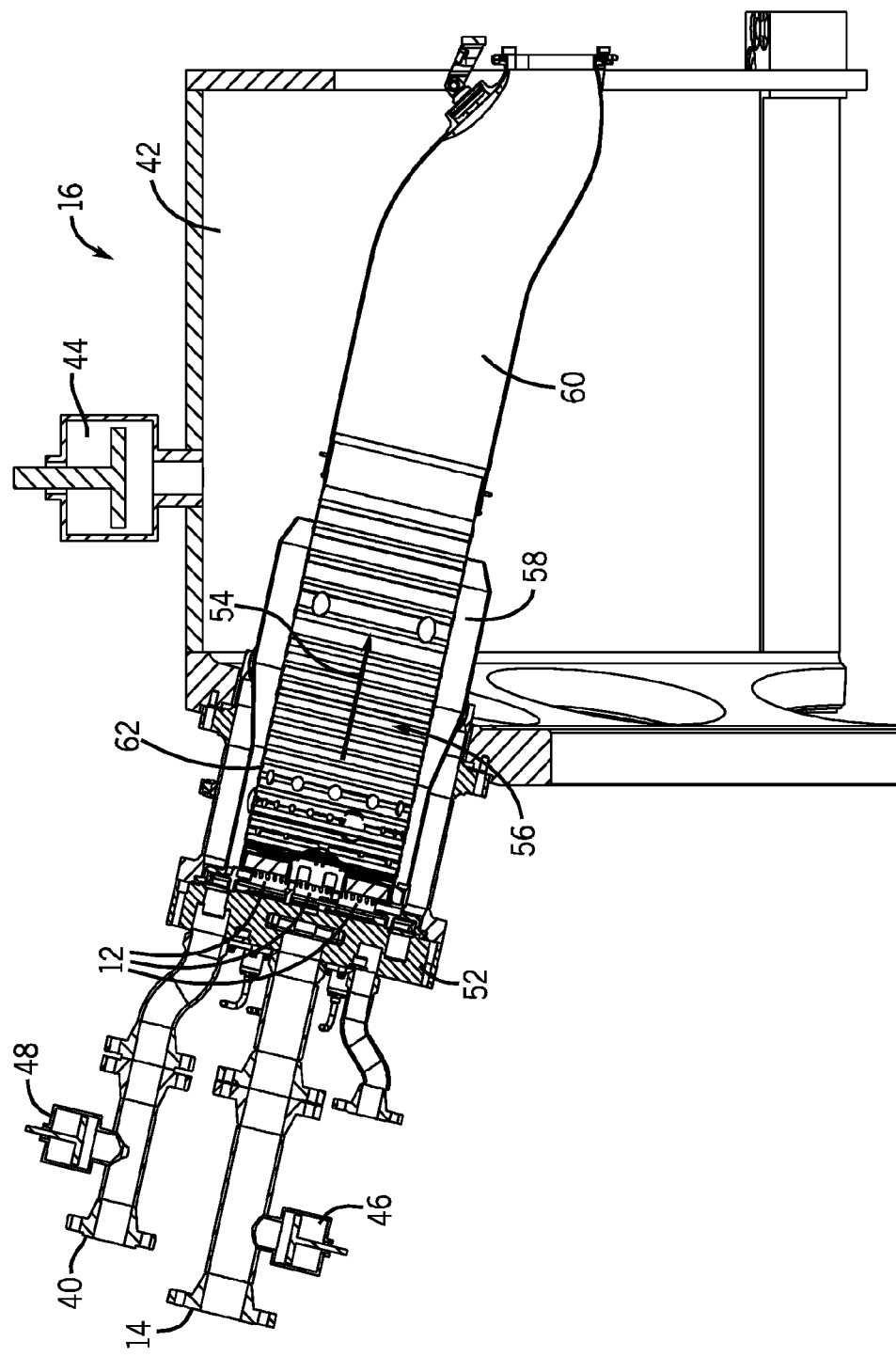
FIG. 3 is a cutaway side view of the combustor, as shown in FIG. 1, with resonators coupled to an air supply, a fuel supply and a diluent supply to reduce combustor driven oscillations in accordance with certain embodiments of the present technique.

FIG. 3 is a detailed cutaway side view illustration of an embodiment of combustor 16. As depicted, combustor 16 includes fuel nozzles 12 that are attached to end cover 52 at a base of combustor 16. An embodiment of combustor 16 may include five or six fuel nozzles 12. Other embodiments of combustor 16 may use a single large fuel nozzle 12. The surfaces and geometry of fuel nozzles 12 are designed to provide an optimal flow path for fuel as it flows downstream into combustor 16, thereby enabling increased combustion in the chamber, thus producing more power in the turbine engine. The fuel is expelled from fuel nozzles 12 downstream in direction 54 and mixes with air before entering a combustion zone 56 inside combustor casing 58. Combustion zone 56 is the location where ignition of the air fuel mixture is most appropriate within combustor 16. In addition, it is generally desirable to combust the air-fuel mixture downstream of the base to reduce the heat transfer from the combustion zone 56 to the fuel nozzles 12. In the illustrated embodiment, combustion zone 56 is located inside combustor casing 58, downstream from fuel nozzles 12 and upstream from a transition piece 60, which directs the pressurized exhaust gas toward turbine 20. Transition piece 60 includes a converging section that enables a velocity increase as the combusted exhaust flows out of combustor 16, producing a greater force to turn turbine 20. In turn, the exhaust gas causes rotation of shaft 22 to drive load 30. In an embodiment, combustor 16 also includes liner 62 located inside casing 58 to provide a hollow annular path for a cooling air flow, which cools the casing 58 and liner 62 around combustion zone 56. Liner 62 also may provide a suitable contour to improve flow from fuel nozzles 12 to turbine 20.

FIG. 3 also presents the fluid supplies and associated resonators 44, 46 and 48 disposed upstream from combustor 16. Pressurized air from compressor 26 flows through air supply 42 before entering combustor 16. Resonator 44 is coupled to air supply 42 to dampen oscillations within air supply 42 and combustor 16. Fuel enters combustor 16 through fuel supply 14. As seen in this figure, resonator 46 is in fluid communication with fuel supply 14 and may serve to dampen oscillations within fuel supply 14, thereby reducing combustor driven oscillations. Similarly, diluent enters combustor 16 through diluent supply 40. Resonator 48 is coupled to diluent supply 40 to dampen oscillations within diluent supply 40 and combustor 16. Resonators 44, 46 and 48 may be mounted at various distances upstream from combustion zone 56. The resonators depicted in FIG. 3 are geometrically variable Helmholtz resonators. However, other embodiments may employ quarter wave and/or concentric hole-cavity resonators, among others. Furthermore, each fluid supply may include multiple resonators tuned to different frequencies.

Figure 4:
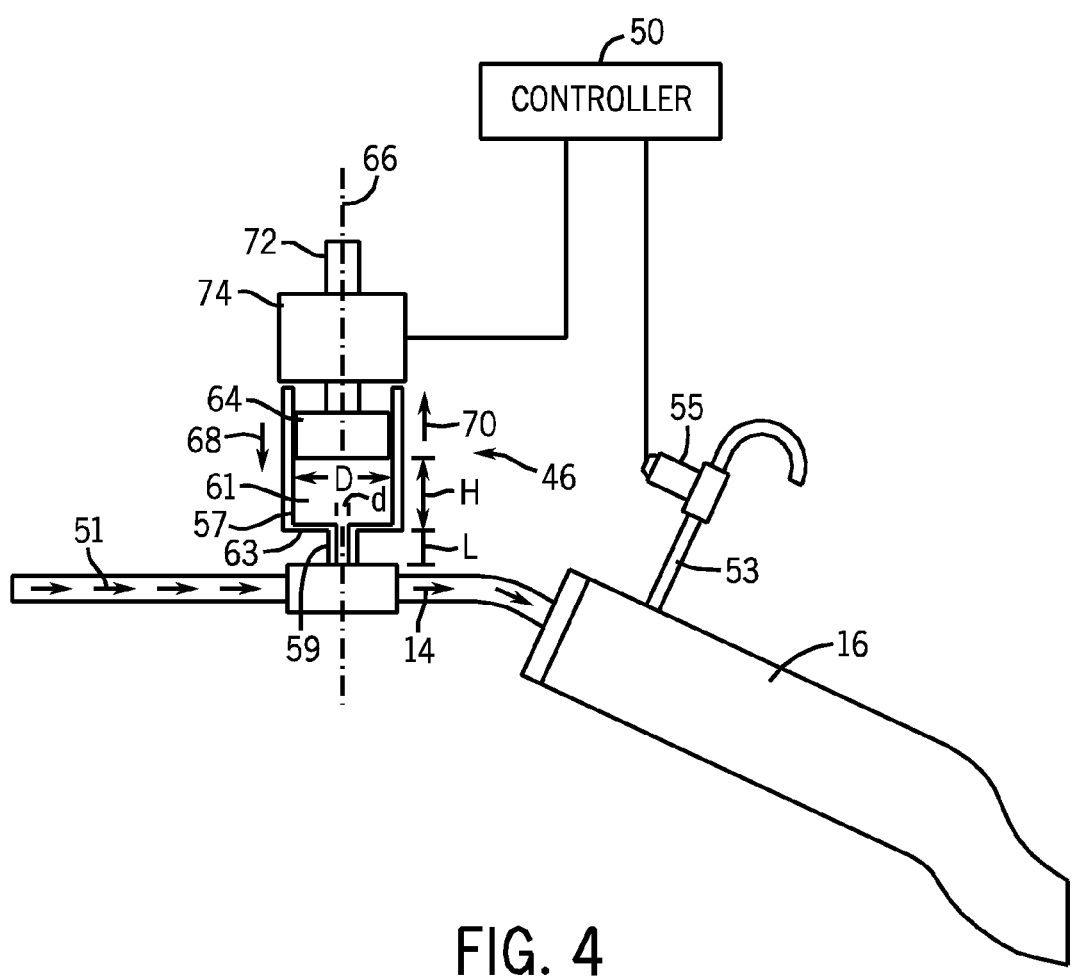
FIG. 4 is a diagrammatical view of a Helmholtz resonator coupled to the fuel supply, as shown in FIG. 1, in accordance with certain embodiments of the present technique.

FIG. 4 shows a diagrammatical view of resonator 46 coupled to fuel supply 14. As previously discussed, fuel supply 14 is positioned upstream from combustor 16. In this configuration, fuel flows in a downstream direction 51 through fuel supply 14 to combustor 16. Pressure within fuel supply 14 may vary with time, inducing oscillations within combustor 16. These oscillations may be measured by a waveguide 53 and a pressure sensor 55 coupled to combustor 16. A waveguide is a duct configured to propagate and guide acoustical energy. Pressure fluctuations within combustor 16 induce corresponding oscillations of equal frequency within waveguide 53. Sensor 55, coupled to waveguide 53, is configured to measure these oscillations by detecting pressure variations within waveguide 53. This arrangement may facilitate accurate pressure measurement without directly exposing pressure sensor 55 to hot combustion gases. Pressure sensor 55 may include a fiber optic sensor, a mechanical deflection sensor, a piezoelectric sensor, or a microelectromechanical systems (MEMS) sensor, among others.

Pressure sensor 55 transmits pressure measurements to controller 50 by an electrical connection or wireless transmission, for example. Controller 50, in turn, analyzes the pressure measurements and determines the dominant frequencies of pressure oscillation within combustor 16. For example, controller 50 may perform a fast Fourier transformation (FFT) on the pressure signal from pressure sensor 55. This transformation converts a time domain pressure signal into the frequency domain. In other words, controller 50 establishes a relationship between acoustical energy and frequency within combustor 16. Controller 50 may then determine the dominant frequency or frequencies of pressure oscillation. For example, controller 50 may identify a single frequency that emits the greatest acoustical energy. Controller 50 may then tune resonator 46 to this frequency to dampen oscillations within combustor 16. Alternatively, controller 50 may be configured with an established threshold acoustical energy. Any frequency emitting acoustical energy above this threshold may be considered a dominant frequency. In configurations employing multiple resonators, controller 50 may tune each resonator to a respective dominant frequency. In this manner, multiple dominant frequencies within combustor 16 may be dampened.

Controller 50 is also communicatively coupled to resonator 46 by an electrical connection or wireless transmission, for example. As previously discussed, resonator 46 may be geometrically configurable such that it may be tuned to a desired frequency. As such, controller 50 may send a signal to resonator 46 indicating the desired frequency to dampen oscillations within combustor 16. Resonator 46 may, in turn, alter its geometric configuration to correspond to the desired frequency. In one embodiment, controller 50 tunes resonator 46 to a dominant frequency within combustor 16. However, as appreciated, controller 50 may tune resonator 46 to any desired frequency which reduces combustor oscillations.

A resonator is an acoustical chamber that induces a pressurized fluid to oscillate at a particular frequency. The geometric configuration of the resonator directly determines the frequency of oscillation. If the fluid pressure is fluctuating due to the influence of an external force, a resonator, tuned to the frequency of these fluctuations, may dampen the magnitude of the fluctuations. One type of resonator is a Helmholtz resonator. A Helmholtz resonator includes a body and a throat having a smaller diameter than the body. Pressurized fluid entering the throat is collected in the body until the pressure within the body becomes greater than the external fluid pressure. At that point, the fluid within the body exits the throat, thereby reducing the pressure within the body. The lower body pressure induces the fluid to enter the body, where the process repeats. The cyclic movement of air establishes a resonant frequency of the Helmholtz resonator.

In the embodiment depicted in FIG. 4, resonator 46 is a cylindrical Helmholtz resonator, including a body 57 and a throat 59. A volume 61 is defined by resonator body 57, a base member 63 and a piston 64 inserted into an open end of resonator body 57. As appreciated, resonant frequency of a Helmholtz resonator is determined by the geometric configuration of the resonator. Specifically, a cylindrical Helmholtz resonator produces a resonant frequency based on the following equation:

$$f = \frac{c}{2\pi} \sqrt{\frac{d^2}{LHD^2}}$$

where c is the speed of sound through the fluid (e.g., air, fuel, or diluent), d is the diameter of throat 59, L is the length of throat 59, H is the distance between piston 64 and base member 63 of resonator body 57, and D is the diameter of resonator body 57. In the present embodiment, throat diameter d, throat length L and resonator body diameter D are fixed. Therefore, resonant frequency f of resonator 46 may be adjusted by altering height H. Height H may be decreased by translating piston 64 along an axis 66 in a direction 68 toward base member 63. Alternatively, height H may be increased by translating piston 64 in a direction 70 along axis 66 away from base member 63. In this manner, resonant frequency f may be adjusted to any frequency within the geometric constraints of resonator 46.

Piston 64 is coupled to shaft 72 which passes through piston driver 74. Piston driver 74 may be any form of linear actuator capable of translating piston 64 via shaft 72. For example, shaft 72 may include a rack with teeth configured to interlock with respective teeth of a pinion within driver 74. The pinion may be coupled to an electric motor, for example, configured to rotate the pinion based on controller input. As the pinion rotates, piston 64 may be linearly driven by the rack of shaft 72. Other linear actuators (e.g., screw drive, pneumatic, hydraulic, electromechanical, etc.) may be employed in alternative embodiments.

Tuning resonator 46 to a dominant frequency of combustor 16 may reduce combustor driven oscillations by dampening pressure oscillations within fuel supply 14. For example, pressure within fuel supply 14 may oscillate based on variations in fuel pump speed, turbulent flow and/or back pressure fluctuations, among other causes. These fuel pressure oscillations may drive corresponding oscillations within combustor 16 at a substantially similar frequency. Therefore, tuning resonator 46 to a dominant frequency of combustor 16 may dampen oscillations within fuel supply 14 and combustor 16. Furthermore, if fuel supply 14 includes multiple resonators, each resonator may be tuned to a dominant frequency within combustor 16. For example, certain embodiments may employ 1, 2, 3, 4, 5, 6, 7, 8, 9, 10, or more resonators, each tuned to a different frequency. The resonators may be arranged in parallel about a particular axial position of fuel supply 14, in series along the length of fuel supply 14, or a combination thereof. In this manner, multiple frequencies may be simultaneously dampened.

Figure 5:
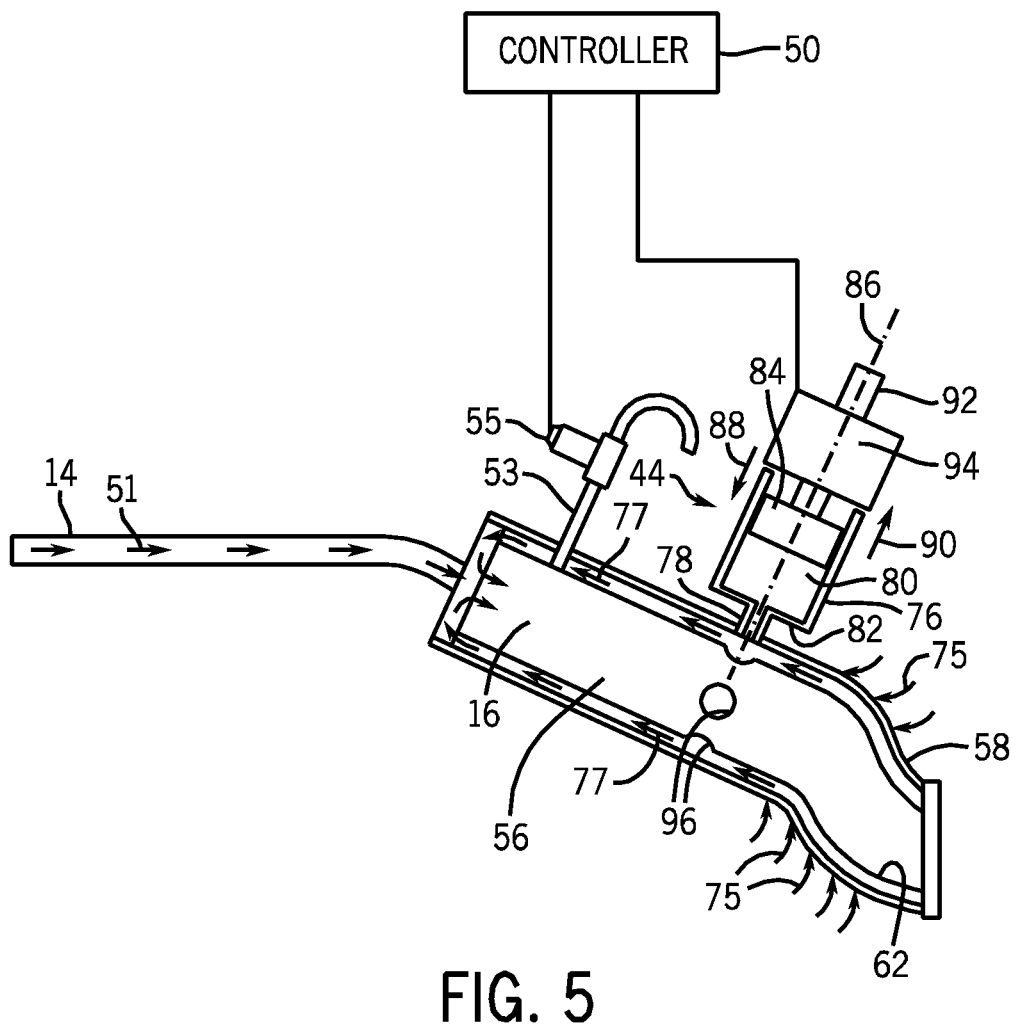
FIG. 5 is a diagrammatical view of a Helmholtz resonator coupled to the air supply, as shown in FIG. 1, in accordance with certain embodiments of the present technique.

FIG. 5 shows a diagrammatical view of air supply resonator 44. As previously discussed, air supply 42 is positioned upstream from combustor 16. In this configuration, air enters combustor 16 in a direction 75 and then flows in a downstream direction 77 between combustor casing 58 and liner 62. The air then mixes with fuel flowing in the downstream direction 51 from fuel supply 14. FIG. 5 presents an alternative location of resonator 44, directly mounted to combustor casing 58. Coupling resonator 44 to combustor casing 58 may serve to dampen oscillations within combustor 16 because pressure oscillations within air supply 42 may propagate downstream through combustor casing 58 before entering combustor zone 56. Therefore, coupling resonator 44 to combustor casing 58 may dampen air pressure oscillations prior to inducing combustor driven oscillations. Similar to resonator 46 depicted in FIG. 4, Helmholtz resonator 44 includes a body 76, a throat 78, an interior volume 80, a base 82 and a piston 84. Interior volume 80 may be varied by translating piston 84 along an axis 86 in a direction 88 toward base 82, or a direction 90 along axis 86 away from base 82. Piston 84 is translated via a shaft 92 and a piston driver 94. In this manner, resonator 44 may be tuned to dampen oscillations within air supply 42 and combustor 16.

As depicted in FIG. 5, combustor 16 includes a waveguide 53 and pressure sensor 55. Pressure sensor 55 is communicatively coupled to controller 50. Controller 50, in turn, is communicatively coupled to piston driver 94. In this configuration, controller 50 may determine the dominant frequencies within combustor 16 and instruct piston driver 94 to tune resonator 44 to the appropriate frequency to dampen oscillations within combustor 16.

Mounting resonator 44 to combustor casing 58 may provide enhanced dampening of oscillations within combustor 16 compared to coupling resonator 44 to air supply 42. Furthermore, as shown in FIG. 5, resonator 44 is mounted adjacent to a diluent inlet 96. This configuration may further enhance dampening of combustor pressure oscillations.

While only one resonator 44 is present in the embodiment depicted in FIG. 5, other embodiments may employ several resonators to dampen multiple frequencies within air supply 42 and combustor 16. For example, certain embodiments may employ 1, 2, 3, 4, 5, 6, 7, 8, 9, 10, or more resonators, each tuned to a different frequency. Furthermore, these resonators may be mounted to air supply 42 and/or combustor casing 58. For example, the resonators may be arranged about the circumference and/or along the longitudinal axis of combustor casing 58 and/or air supply 42.

Figure 6:
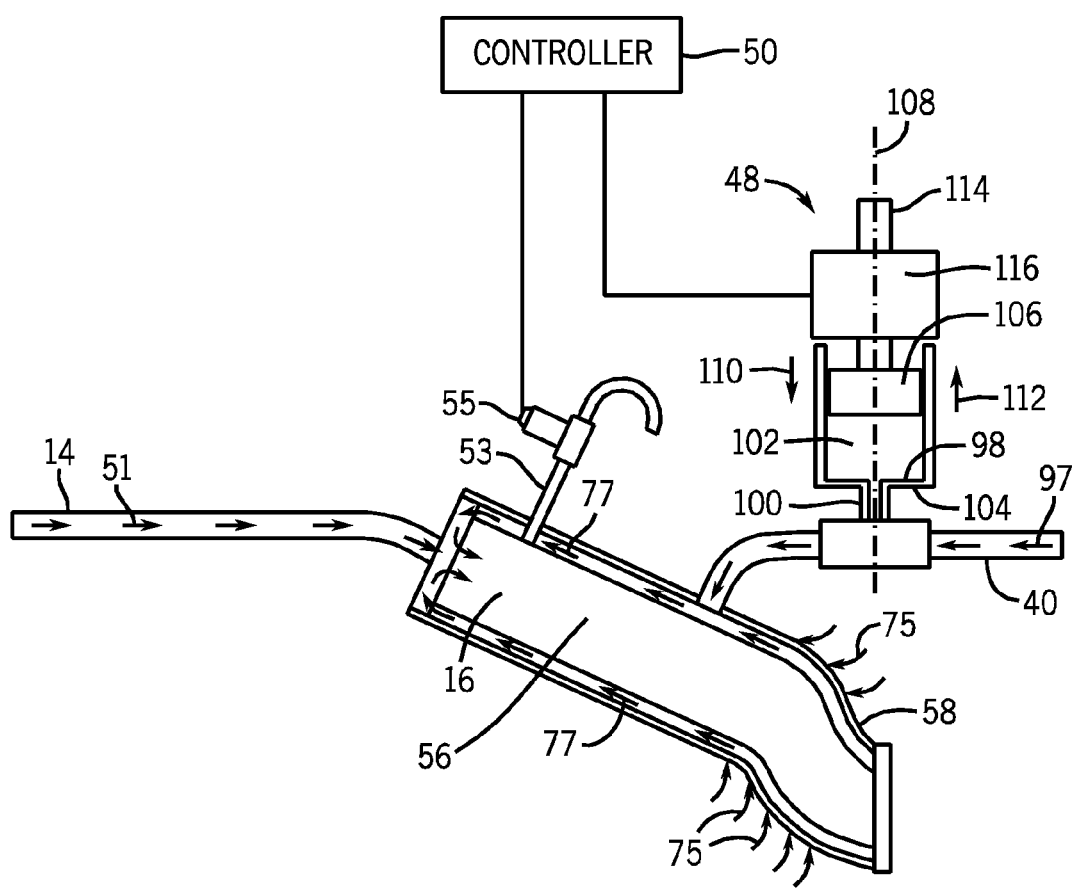
FIG. 6 is a diagrammatical view of a Helmholtz resonator coupled to the diluent supply, as shown in FIG. 1, in accordance with certain embodiments of the present technique.

FIG. 6 shows a diagrammatical view of diluent resonator 48. As previously discussed, diluent supply 40 is positioned upstream from combustor 16. In this configuration, diluent flows in a downstream direction 97 through diluent supply 40 to combustor 16. As illustrated, diluent then mixes with air flowing in the downstream direction 77 prior to entering combustion zone 56. In alternative embodiments, diluent may flow in a downstream direction directly into fuel nozzle 12. Similar to resonator 46 depicted in FIG. 4, Helmholtz resonator 48 includes a body 98, a throat 100, an interior volume 102, a base 104 and a piston 106. Interior volume 102 may be varied by translating piston 106 along an axis 108 in a direction 110 toward base 104, or a direction 112 along axis 108 away from base 104. Piston 106 may be translated via a shaft 114 and a piston driver 116. In this manner, resonator 48 may be tuned to dampen oscillations within diluent supply 40 and combustor 16.

As depicted in FIG. 6, combustor 16 includes a waveguide 53 and pressure sensor 55. Pressure sensor 55 is communicatively coupled to controller 50. Controller 50, in turn, is communicatively coupled to piston driver 116. In this configuration, controller 50 may determine the dominant frequencies within combustor 16 and instruct piston driver 116 to tune resonator 48 to the appropriate frequency to dampen oscillations within combustor 16.

While only one resonator 48 is present in the embodiment depicted in FIG. 6, other embodiments may employ multiple resonators 48 to dampen multiple frequencies with diluent supply 40 and combustor 16. Furthermore, while cylindrical Helmholtz resonators are depicted in the embodiments of FIGS. 4-6, other cross sections (e.g., polygonal, elliptical, etc.) may be employed in alternative embodiments. In addition, further embodiments may employ a combination of resonators depicted in FIGS. 4-6. For example, certain embodiments may include resonator 46 coupled to fuel supply 14, resonator 44 coupled to combustor casing 58 and resonator 48 coupled to diluent supply 40. Each of these resonators may be communicatively coupled to controller 50. Furthermore, controller 50 may tune each of the resonators to the same frequency or different frequencies based on an analysis of combustor oscillations. For example, controller 50 may determine that a first combustor oscillation frequency is driven by diluent supply 40 and a second combustor oscillation frequency is driven by air supply 42. Controller 50 may then tune diluent supply resonator 48 to the first frequency and air supply resonator 44 to the second frequency. In this manner, both combustor oscillation frequencies may be dampened.

Figure 7:
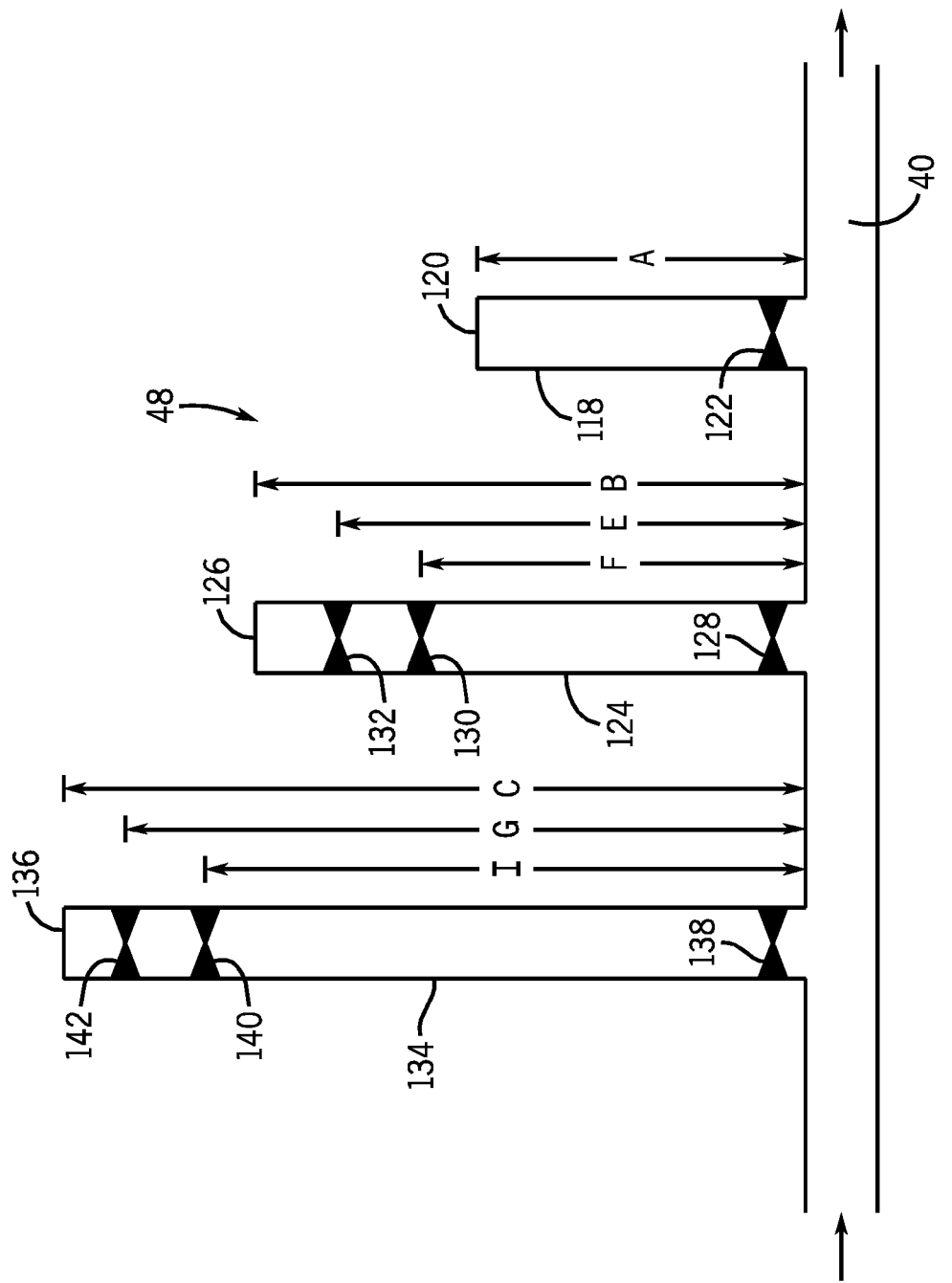
FIG. 7 is a diagrammatical view of multiple quarter wave resonators coupled to the diluent supply, as shown in FIG. 1, in accordance with certain embodiments of the present technique.

FIG. 7 presents an alternative embodiment of diluent resonator 48. In this embodiment, resonator 48 includes multiple quarter wave resonators, 118, 124 and 134. Quarter wave resonator 118 includes a tube of height A that terminates in an end cap 120. Resonator 118 also includes an isolation valve 122 which may open to couple resonator 118 to diluent supply 40. When isolation valve 122 is closed, resonator 118 is isolated from diluent supply 40, effectively uncoupling resonator 118 from diluent supply 40.

As the name implies, a quarter wave resonator is tuned to a quarter of the wavelength of an acoustical oscillation. Therefore, the resonant frequency of quarter wave resonator 118 is as follows:

$$f = \frac{c}{4A}$$

where c is the speed of sound in the fluid (e.g., air, fuel or diluent), and A is the height of resonator 118. Consequently, resonator 118 may dampen a frequency corresponding to a wavelength four times height A.

Similarly, resonator 124 terminating in end cap 126 may dampen a frequency corresponding to a wavelength four times height B. Resonator 124 includes an isolation valve 128 to facilitate uncoupling of resonator 124 from diluent supply 40. Under certain operating conditions combustor pressure oscillations may include multiple dominant frequencies. For example, combustor 16 may experience pressure oscillations at frequencies corresponding to wavelengths four times greater than height A and four times greater than height B. In such a situations, both isolation valves 122 and 128 may be opened such that resonators 118 and 124 may dampen the oscillations at both frequencies. In other operating conditions, combustor 16 may only experience oscillations corresponding to a wavelength four times greater than height A. In such a situation, isolation valve 128 may be closed to uncouple resonator 124 from diluent supply 40. Leaving isolation valve 128 open when no pressure oscillation corresponding to a wavelength four times height B is present in combustor 16 may have a detrimental effect on diluent flow.

As previously discussed, the resonant frequency of quarter wave resonators is dependent on tube length. Therefore, a quarter wave resonator may be tuned by increasing or decreasing its length. One method of changing resonator length is through a series of valves. For example, resonator 124 includes a lower valve 130 and an upper valve 132. Valve 130 is located a height F above diluent supply 40, while valve 132 is at height E. These valves may be opened and closed to adjust the effective length of resonator 124. If valve 130 is closed while valve 128 is open, resonator 124 may dampen oscillations corresponding to a wavelength four times height F. If valves 128 and 130 are open while valve 132 is closed, resonator 124 may dampen oscillations corresponding to a wavelength four times height E. If all three valves 128, 130 and 132 are opened, resonator 124 may dampen oscillations corresponding to a wavelength four times height B.

Diluent supply 40 also includes a third resonator 134 having an end cap 136. Similar to resonator 124, resonator 134 includes an isolation valve 138 and two length adjusting valves 140 and 142. As previously discussed, if isolation valve 138 is closed, resonator 134 may be isolated from diluent supply 40, nullifying the effect of resonator 134. However, if isolation valve 138 and length adjusting valves 140 and 142 are open, resonator 134 may dampen frequencies corresponding to a wavelength four times height C of resonator 134. The effective height of resonator 134 depends on the state of valves 140 and 142. Specifically, if valves 140 and 142 are open, resonator 134 may dampen oscillations corresponding to four times height C, the distance between diluent supply 40 and end cap 136. If valves 138 and 140 are open while valve 142 is closed, the effective height of resonator 134 decreases to a height G. If valve 140 is closed while valve 138 is open, the effective height of resonator 134 further decreases to height I. In this manner, resonator 134 may be tuned to a desired frequency based on dominant frequencies detected within combustor 16.

While three quarter wave resonators are employed in the embodiment depicted in FIG. 7, other embodiments may include more or fewer resonators (e.g., 1, 2, 4, 5, 6, 7, 8, 9, 10, or more). For example, certain turbine system configurations may produce four dominant frequencies within combustor 16. In such a system, four resonators may be coupled to diluent supply 40 to dampen oscillations at each of these four frequencies. Other turbine system configurations may employ two resonators to dampen two dominant frequencies. Furthermore, because individual resonators may be decoupled by closing isolation valves, a turbine system that produces two dominant frequencies may include more than two resonators coupled to diluent supply 40. In such a configuration, additional frequencies may be dampened by opening the isolations valves of the previously uncoupled resonators.

Other embodiments may include a different number of valves within each resonator. For example, resonators may include 1, 2, 3, 4, 5, 6, 7, 8, 9, 10, or more valves, in certain embodiments. Furthermore, the height and spacing between each valve may vary. Specifically, tighter spacing between valves facilitates greater control of the effective length of the resonators. In addition, operation of the valves may be controlled by controller 50. For example, controller 50 may determine the number of dominant frequencies and open a corresponding number of isolation valves. Similarly, controller 50 may adjust the resonant frequency of each resonator to correspond to each dominant frequency detected within combustor 16 by opening and closing length adjusting valves. While the quarter wave resonators shown in FIG. 7 are disposed to diluent supply 40, a similar configuration may be employed for air supply resonator 44 and/or fuel supply resonator 46.

Figure 8:
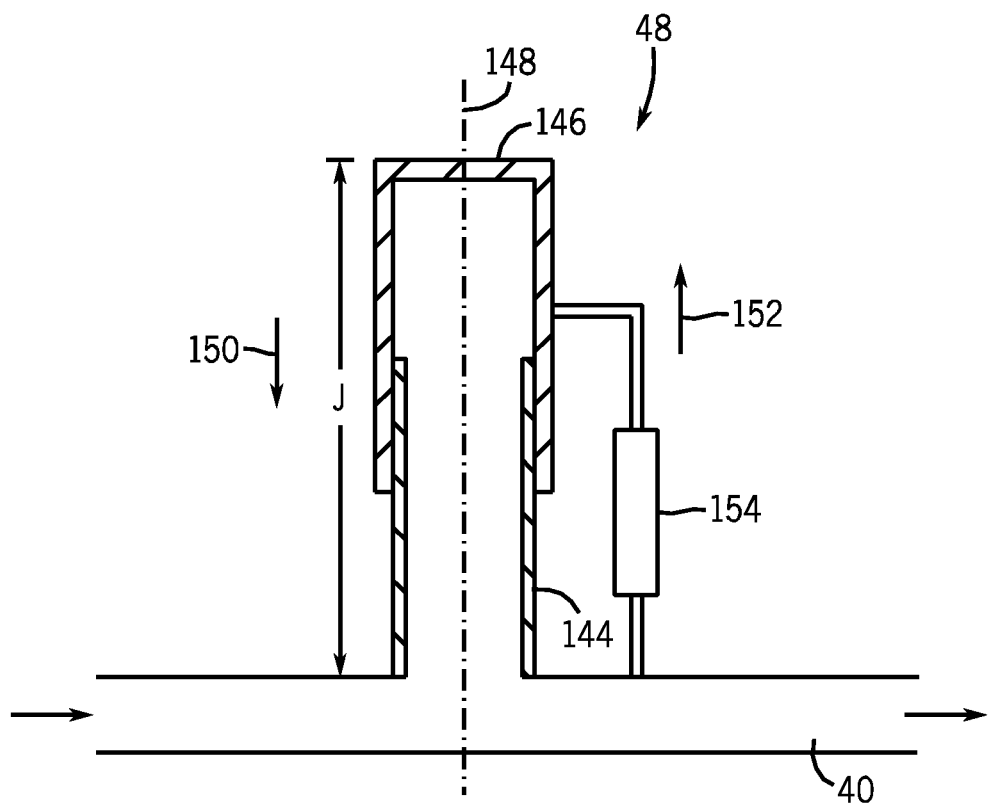
FIG. 8 is a diagrammatical view of an alternative quarter wave resonator coupled to the diluent supply, as shown in FIG. 1, in accordance with certain embodiments of the present technique.

FIG. 8 illustrates an alternative configuration for varying the height of quarter wave resonator 48. Instead of employing a series of valves, resonator height may be continuously varied. In this embodiment, resonator 48 includes a base member 144 coupled to diluent supply 40, and an adjustable end cap 146 disposed about an open end of base member 144. The cross section of base member 144 and end cap 146 may be circular or polygonal, among other configurations. The outer diameter of base member 144 may be substantially similar to the inner diameter of end cap 146 to establish a seal. The seal may substantially block passage of fluid between base member 144 and end cap 146, while enabling end cap 146 to translate with respect to base member 144.

A height J of resonator 48 may be adjusted by translating end cap 146 along axis 148. Specifically, if end cap 146 is translated in a direction 150 along axis 148, height J is reduced. If end cap 146 is translated in a direction 152 along axis 148, height J is increased. End cap 146 may be coupled to a linear actuator 154 configured to translate end cap 146 in both directions 150 and 152 along axis 148. Linear actuator 154 may be any suitable type such as pneumatic, hydraulic, or electromechanical, among others. In this configuration, height J of resonator 48 may be adjusted to dampen a diluent pressure oscillation frequency, reducing combustor driven oscillations.

Linear actuator 154 may be communicatively coupled to the controller 50 and continuously tuned to a frequency that dampens combustor oscillations. In addition, several resonators of this configuration may be coupled to diluent supply 40 to dampen multiple frequencies. Furthermore, in certain embodiments, continuously variable quarter wave resonators may be combined with valve-adjustable quarter wave resonators and/or non-adjustable quarter wave resonators to dampen oscillations of multiple frequencies. Furthermore, continuously variable quarter wave resonators may be employed to dampen oscillations within air supply 42 and/or fuel supply 14.

Other acoustical resonator configurations (e.g., concentric hole-cavity resonators) may be employed in alternative embodiments. Furthermore, combinations of different resonator types may be employed throughout the turbine system and/or among the fluid supplies. For example, in certain embodiments, air supply 42 may employ a Helmholtz resonator while fuel supply 14 and diluent supply 40 may employ quarter wave resonators. In other embodiments, air supply 42 may employ a Helmholtz resonator and a quarter wave resonator to dampen multiple frequencies. Furthermore, the number of resonators may vary between fluid supplies. For example, air supply 42 may include a single resonator, fuel supply 14 may include three resonators and diluent supply 40 may not include any resonators.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a turbine engine, comprising:
   a compressor;
   a turbine;
   a combustor disposed downstream from the compressor and upstream from the turbine;
   a fluid injection system configured to inject one or more fluids into the combustor;
   a variable geometry resonator directly fluidly coupled to a fuel path of the fluid injection system; and
   a controller configured to adjust a geometric configuration of the variable geometry resonator in response to pressure feedback from a pressure sensor to establish a desired geometric configuration that dampens pressure oscillations in the fuel path and in the combustor.

2. The system of claim 1, wherein the variable geometry resonator comprises a Helmholtz resonator.

3. The system of claim 1, wherein the variable geometry resonator comprises a quarter wave resonator.

4. The system of claim 1, wherein the pressure sensor is fluidly coupled to the combustor.

5. The system of claim 1, wherein the variable geometry resonator comprises a plurality of variable geometry resonators tuned to different frequencies.

6. The system of claim 1, comprising a second variable geometry resonator directly fluidly coupled to a diluent path of the fluid injection system, wherein the controller is configured to adjust a second geometric configuration of the second variable geometry resonator in response to the pressure feedback to establish a second desired geometric configuration that dampens pressure oscillations in the diluent path and in the combustor.

7. The system of claim 1, comprising a third variable geometry resonator directly fluidly coupled to an air path of the fluid injection system, wherein the controller is configured to adjust a third geometric configuration of the third variable geometry resonator in response to the pressure feedback to establish a third desired geometric configuration that dampens pressure oscillations in the air path and in the combustor.

8. A system, comprising:
   a variable geometry resonator configured to directly fluidly couple to a fuel path upstream from a combustor of a turbine engine, wherein the variable geometry resonator is configured to establish a desired geometric configuration that dampens pressure oscillations in the fuel path and in the combustor in response to pressure feedback from a pressure sensor fluidly coupled to the combustor.

9. The system of claim 8, wherein the variable geometry resonator comprises a Helmholtz resonator, a quarter wave resonator, or both.

10. The system of claim 8, wherein the variable geometry resonator comprises a plurality of variable geometry resonators tuned to different frequencies.

11. The system of claim 8, comprising a fluid injection system having the fuel path, wherein the variable geometry resonator is directly fluidly coupled to the fuel path.

12. The system of claim 8, comprising the combustor having the variable geometry resonator directly fluidly coupled to the fuel path upstream from the combustor.

13. The system of claim 8, comprising a controller coupled to the variable geometry resonator, wherein the controller is configured to tune the variable geometry resonator in response to the pressure feedback from the pressure sensor.

14. The system of claim 13, wherein the controller is configured to adjust a geometric configuration of the variable geometry resonator to establish the
   desired geometric configuration.

15. A method, comprising:
   receiving pressure feedback from a pressure sensor fluidly coupled to a combustor of a turbine engine; and
   adjusting a geometric configuration of a variable geometry resonator directly fluidly coupled to a fuel path upstream from the combustor based on the pressure feedback to establish a desired geometric configuration that dampens pressure oscillations in the fuel path and in the combustor.

16. The method of claim 15, comprising injecting fuel from the fuel path into the combustor downstream from the variable geometry resonator, wherein the fuel comprises a gas fuel, a liquid fuel, or a combination thereof.

17. The method of claim 15, comprising tuning a plurality of variable geometry resonators directly fluidly coupled to the fuel path upstream from the combustor based on the pressure feedback.

18. The system of claim 8, comprising a second variable geometry resonator configured to directly fluidly couple to a diluent path upstream from the combustor, wherein the second variable geometry resonator is configured to establish a second desired geometric configuration that dampens pressure oscillations in the diluent path and in the combustor in response to the pressure feedback.

19. The system of claim 8, comprising a third variable geometry resonator configured to directly fluidly couple to an air path upstream from the combustor, wherein the third variable geometry resonator is configured to establish a third desired geometric configuration that dampens pressure oscillations in the air path and in the combustor in response to the pressure feedback.

20. The method of claim 15, comprising adjusting a second geometric configuration of a second variable geometry resonator directly fluidly coupled to a diluent path upstream from the combustor based on the pressure feedback to establish a second desired geometric configuration that dampens pressure oscillations in the diluent path and in the combustor, or adjusting a third geometric configuration of a third variable geometry resonator directly fluidly coupled to an air path upstream from the combustor based on the pressure feedback to establish a third desired geometric configuration that dampens pressure oscillations in the air path and in the combustor.

* * * * *